Sept. 14, 1937.  R. TONDEUR  2,092,899
MANUFACTURE OF FLEXIBLE METAL TUBES
Filed May 8, 1934  6 Sheets-Sheet 1
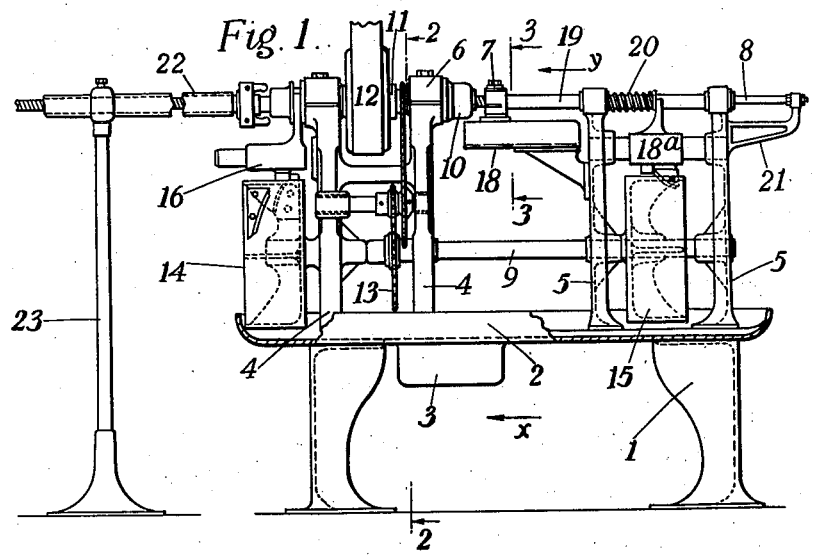
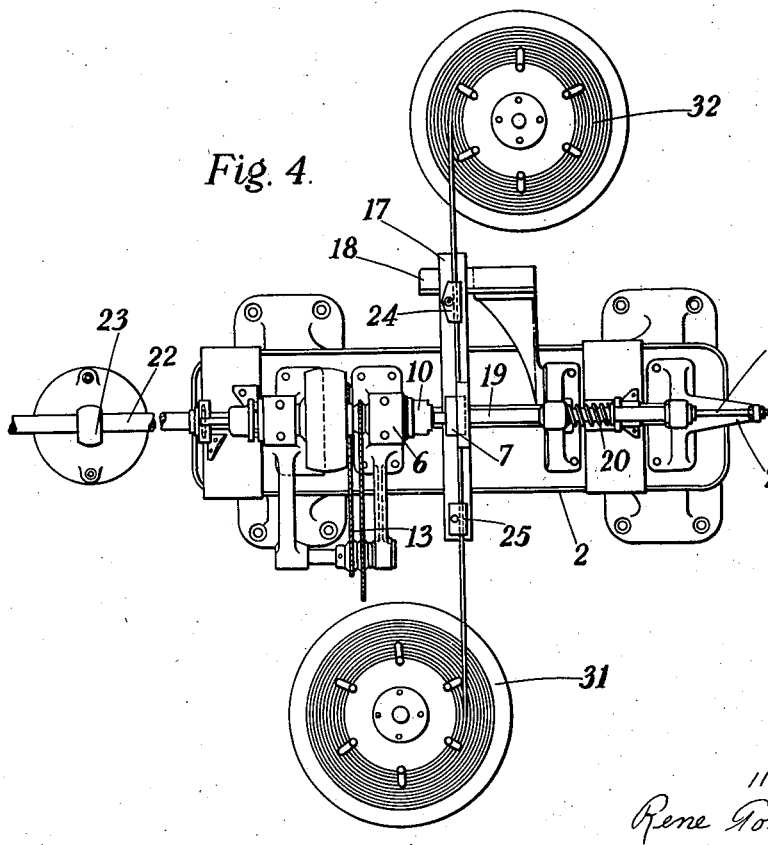
INVENTOR
Rene Tondeur
BY
Nathan, Bowman & Helferich
ATTORNEYS Sept. 14, 1937   R. TONDEUR   2,092,899
MANUFACTURE OF FLEXIBLE METAL TUBES
Filed May 8, 1934   6 Sheets-Sheet 2

INVENTOR
Rene Tondeur
BY
Nathan, Bowman + Helferich
ATTORNEYS

Sept. 14, 1937.  R. TONDEUR  2,092,899
MANUFACTURE OF FLEXIBLE METAL TUBES
Filed May 8, 1934   6 Sheets-Sheet 3

INVENTOR
Rene Tondeur
BY
Nathan, Bowman & Helfrich
ATTORNEYS

Fig. 7.
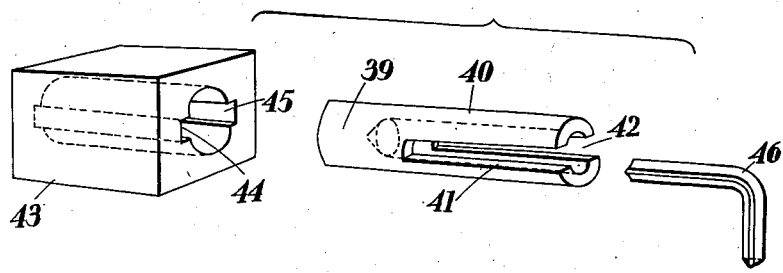
Fig. 9.  Fig. 10.
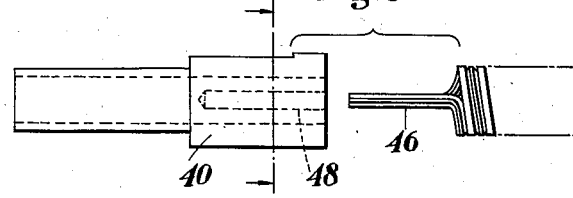 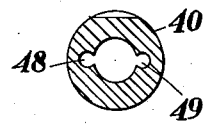
Fig. 11.  Fig. 12.
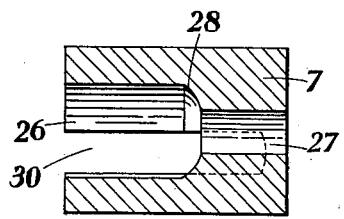 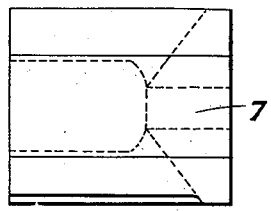
Fig. 13.  Fig. 14.  Fig. 15.
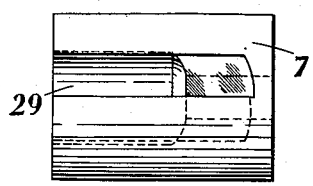 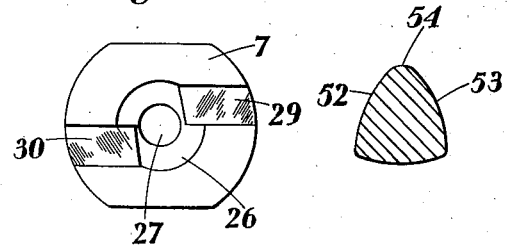

Sept. 14, 1937.  R. TONDEUR  2,092,899
MANUFACTURE OF FLEXIBLE METAL TUBES
Filed May 8, 1934   6 Sheets-Sheet 5

INVENTOR
Rene Tondeur
BY
Nathan, Bowman + Helferich
ATTORNEYS

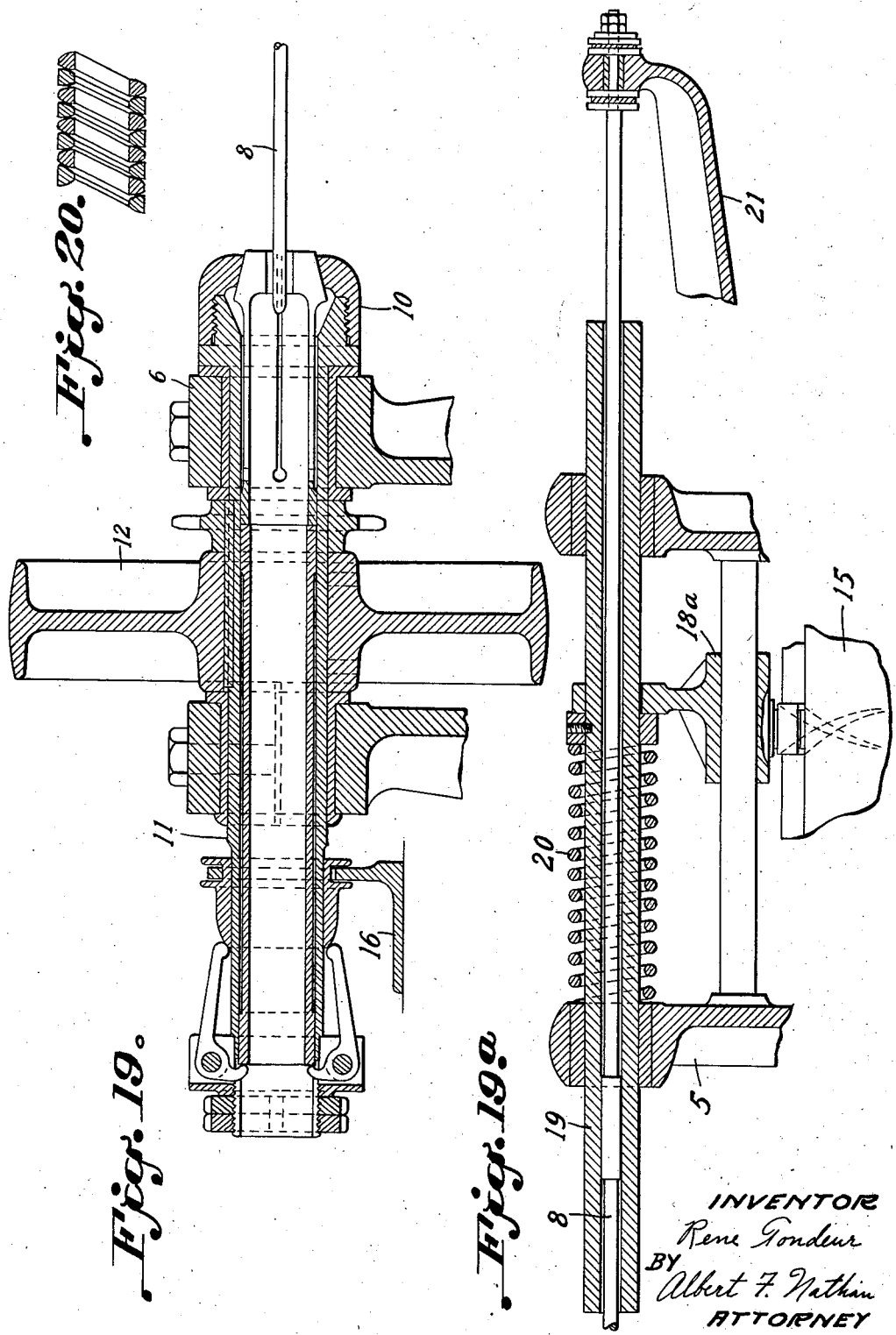

Patented Sept. 14, 1937

2,092,899

UNITED STATES PATENT OFFICE 2,092,899

MANUFACTURE OF FLEXIBLE METAL TUBES

Rene Tondeur, London, England, assignor to Bowden (Engineers) Limited, Willesden Junction, England Application May 8, 1934, Serial No. 724,628
In Great Britain November 20, 1933

19 Claims. (Cl. 153—64)

The present invention relates to improvements in flexible tubing, and the methods of manufacture thereof by winding as distinguished from coiling, of the type which is composed of two or more closely interwound relatively laterally displaceable open coils, and more particularly to tubing, and methods for the manufacture thereof, of the type described in my co-pending application 695,146 dated 25th October, 1933, for use in what is in such specification termed Bowden mechanism.

As described in my previous specification aforesaid, flexible tubing, designed to form the outer member of such Bowden mechanism is composed of two or more closely interwound open-coiled wires having such a pitch and cross-sectional shape, that the coils are at all times in normal use in continuous spiral contacting relationship, so as to render the interwound coil tubing self-sustaining against relative bodily lateral displacement of the coils under axial compression, whilst the interwound coils are adapted, when flexed, to mutually interact to cause relative transverse movements of the curved portions of the respective coils to be set up between them, so that they interpenetrate and move into and out of concentric relationship without substantially varying the effective axial length of the tubing as a whole.

Such tubing composed of two closely interwound open coils can comprise one coil formed of round section and the other of trapezoidal or like section, or one coil formed of trapezoidal or like section and the other of reverse trapezoidal or like section. It can also contain four or more even number of coils of appropriate section, though this in general gives little advantage and there is a danger, if the number of coils be increased, that the pitch of each coil becomes coarse so that birdcaging under axial load may result.

Where in the following description we speak of the leading coil and following coil it is to be understood that the leading coil may be formed of triangular or trapezoidal wire wound base inward, in which case the following coil is formed either of wire of triangular or trapezoidal section wound base outward or of wire of round section, or the leading coil may be formed of wire of round section in which case the following coil is formed of wire of triangular or trapezoidal section wound base outward.

"It is to be understood that the present specification and the claims thereof are confined to methods of manufacturing the flexible tubing by winding as distinguished from coiling. The normal use of these terms are those defined in vol. 5 p. 487 of "Machinery's Encyclopedia" with 1929 Supplement published by the Machinery Publishing Company Limited. "The terms 'spring winding' and 'coiling' in general trade usage denote two entirely distinct processes. In winding the machine grips the wire and holds it firmly against the center arbor. The wire then turns round the arbor as in winding on a lathe. The diameter of the spring in this case is determined by the size of the arbor and the tension given it while winding. In coiling springs, however, the action is entirely different. The wire is first forced into a circle by rolls or tools acting on the outside of the wire, and the forming of the spring depends very little on the center arbor. The center arbor does not have to be of the same inside diameter as the coil of the spring to be formed." It must therefore be understood that the description and claims apply to the production of flexible tubes by winding as above defined, and are not to be read as applying to the production of flexible tubing by coiling, nor do they extend to cases where coils, one of which lies substantially within the other, are formed by coiling wires on mandrels or arbors (or parts thereof) of different diameters.

According to the main feature of this invention the winding of the coils proceeds simultaneously, and so that the windings of the following wire (or wires) are forced between the windings of the leading wire (or wires), so as to continuously separate and open up the latter, whereby the turns of the respective coils are made to press against each other with a force which keeps the coils in a permanent state of axial compression. In some cases this force may be increased by external means as hereinafter described. It will therefore be apparent that one of the leading characteristics of the method according to the present invention is that in winding the second wound wire tensions the first wound wire and vice versa.

Conveniently and advantageously the tubing is produced by winding closely together more than one whole turn of the wire of the leading coil about the arbor or mandrel of a winding machine, and then winding simultaneously the wire of the following coil from a diametrically opposite starting point on the mandrel so that the wire of such following coil is forcibly entered between the beginning and end of the first turn of the leading coil the winding of the two coils then proceeding simultaneously, and throughout the winding, the leading coil proceeds in advance of the following coil by an amount of wrap of wire round the mandrel which is constant.

Another feature of the present invention is that the wires are led to the mandrel from points so placed as to balance the pull of the wires on the mandrel.

For the purpose of rendering the coils substantially relatively immovable under the working axial pressure without employing an undue amount of material it is preferred to make the angle between the converging sides of the triangular or trapezoidal section in the case of the wire wound with the base outward not more than 45° and in the case of the wire wound base inward not more than 60°, the tangent of the semi-angle being in all cases sufficiently in excess of the co-efficient of friction to permit easy lateral displacement of the respective coils. The best results are believed to be obtained when both angles are of less than 45° with the angle in the case of the wire wound base inward somewhat greater than the angle in the case of the wire wound base outward.

When one of the coils is triangular or trapezoidal and the other circular, I prefer to make the former the leading coil, winding it with the base inwards, and to make the angle of such coil not greater than 45°. In all cases the angles referred to are the finishing angles after winding is complete. In the case of triangular or trapezoidal wires I prefer to avoid strongly curved forms.

The amount of the advance wrapping of the leading coil is of importance. Normally this advance includes a part of a turn, such part being determined by the angular distance between the points where the leading and following coils are led on to the mandrel. In the case where this angular distance is 180°, the best results are generally given by an advance of one and a half or two and a half turns, but the optimum amount necessarily depends, inter alia, on the stiffness of the wire. In general an advance of more than three and a half turns should be avoided on account of the excessive resistance which such larger numbers of turns, tightly wound around the mandrel, would offer to displacement by the introduction of the following wire. The force required to effect the interwinding causes a burnishing action between the wires which conduces to attaining continuity of spiral contact in spite of irregularity in the drawing of the wires, and also to a reduction of the axial foreshortening of the tubing under axial compression, owing to the better surface contact thus obtained between adjacent turns of the trapezoidal-section wire, as the pressure per unit of contacting area on such faces will be lessened.

In winding care must be taken that the apex of the following wire shall not be so tightly pressed against the arbor or mandrel as to deform the wire in such a way as to cause it to overhang the adjacent turns of the other wire, since if this occurs the respective coils may interlock and so prevent or render difficult any relative lateral displacement of the coils.

This difficulty can be eliminated or decreased by another feature of my invention viz., by making the following wires of trapezoidal form with a convex apex or shorter end so that the effect of deformation is to diminish such convexity or to render the end approximately straight.

By a further feature of this invention one or both wires are made of triangular or trapezoidal form with convex sides so that the effect of sectional deformation in winding and the pressure from the other coil to which they are subjected in winding has the effect of rendering the final form of such sides approximately rectilinear.

The winding tool may take the form of a die block which is apertured to permit the arbor or mandrel to pass therethrough and is slotted to permit the two wires to enter substantially tangentially an enlarged portion of the aperture of the die from opposite sides of the winding machine and to pass on to the arbor or mandrel at diametrically opposite points to give a balanced pull thereon.

According to a further feature of my invention the aperture through the die block is enlarged for a certain distance to provide clearance for winding the wire on the arbor or mandrel.

The junction of the upper face of one of the above mentioned slots with the wall of this enlarged aperture forms a fulcrum or bending point for the coil as it is led on to the mandrel, as also does the junction of the lower face of the other slot with such wall. The distance of such fulcra from a vertical plane passing through the axis of the arbor or mandrel contributes to determining the tightness with which the wires are wound on the arbor or mandrel, the tension being increased with the diminution of such distance.

Laterally of the die block and carried on the same mounting plate, are wire guides, one of which may be permanently fixed and if desired friction loaded, and serves to guide that wire which loads in winding, and the other of which is adjustably mounted and friction loaded and serves to guide the second wire. By increasing the frictional reaction between the wires and their guides the diameter of the convolution may be reduced and vice versa.

The angle which the guiding grooves in the wire guides make to a vertical plane containing the axis of the arbor or mandrel and which for untwisted wire would conform to the angle of the convolutions of the coils will generally require to be made to vary therefrom by trial and observation to correct the twist which is present in the raw wire product and therefore means will generally be provided for making such adjustment.

The die block with its mounting plate may be supported on torque rails bolted to the body of the machine.

Where desirable and more particularly in cases where the lead of the first wire is small provision may be made to press the die block yieldingly against the leading coil during winding, so as to increase the resistance offered to winding the second wire between turns of the first wire, suitable adjusting means being provided if desired for varying the force of the spring.

According to a further feature of my invention such winding tool may in certain cases be mounted for approach and recession with respect to the rotating collet or chuck of a spring winding machine in which means, e. g., a cam, is provided for periodically opening and closing the collet, and means, e. g., another cam is provided for advancing the die tool when the collet or chuck is released after such die tool has been caused to recede by the winding of a certain number of coils on the mandrel, whereafter the collet is again closed to grip the coil on the mandrel and repeat the operation of winding a like number of coils.

A convenient way of starting the winding is as follows:—

A tube is inserted in the collet or chuck of the winding machine, and over this is passed a sleeve which can be slid along the tube sufficiently to uncover opposed longitudinal slots positioned at diametrically opposite points of the sleeve, and leading back to the free end thereof. This tube is gripped in the collet or chuck of the winding machine, and the arbor or mandrel is then inserted into the tube in which it is a running fit.

The end of the leading wire is then bent at right angles, and such bent end is inserted in one of the longitudinal slots in the tube and held therein by moving the sliding sleeve to cover the slot. The die block is then advanced up to the tube allowing the wire to enter the corresponding slot therein. The collet or chuck is now rotated, with the die block held from rotation, so as to wind a sufficiency of such leading wire closely round the mandrel.

Leaving the turns of the wire and the tube and the mandrel in position, the die block is now withdrawn and a similarly bent end of the following wire is inserted in the other longitudinal slot of the tube, whereafter the die block is again advanced up to the tube allowing the following wire to enter the opposite slot in the die block. The collet or chuck is then again rotated to interwind several turns of the second wire into the windings of the first wire during which operation a corresponding number of turns of the first wire are further wound on the mandrel, so that a sufficient length of interwound wires is made to enable this to be gripped by the collet or chuck.

The collet or chuck is now released, and the tube and sleeve are removed. Thereafter the arbor or mandrel with the started coils thereon is pushed into position in the collet or chuck which is then actuated to grip the coils and the machine is started.

The winding machine may be adapted for winding a long continuous coil which is afterwards cut into shorter lengths by special tools, the long coil as it is being wound being arranged to be run off into a guide trough or pipe.

Instead of intermittently running off the flexible tubing as it is wound the winding machine may be adapted so that it is continuously run off through a rotating chuck. For this purpose the rotating chuck may be provided with roller jaws having knurled or serrated round grooved peripheries for gripping the tubing sufficiently to rotate this, whilst permitting it to slide therethrough by axial pressure on the tubing as it is formed against the face of the die block.

Such an arrangement of roller jaw chuck may also be adopted for intermittent feed of the flexible tubing.

In working, the wire is led from wire reels supported on opposite sides of the machine by reel standards. In winding the leading wire, the wire reel is preferably so placed that the wire runs to the mandrel in such a manner that the set in the wire, due to its having been wound on the reel, tends to bring the turns close together, so that the winding is quite stiff. The following wire may be led similarly from its reel, although for the purposes of the present invention this is not essential.

In order that our invention may be more clearly understood I will now describe certain forms thereof by reference to the accompanying drawings.

Fig. 1 is a side elevation of a winding machine adapted for carrying out the processes according to the present invention.

Fig. 4 is a plan view.

Figs. 7 and 8 are views illustrating components temporarily employed for starting the winding.

Figs. 9 and 10 are side and transverse sectional views of a variant form of one of the components shown by Figs. 7 and 8.

Figs. 11, 12, 13, and 14 are central vertical section, plan, side and front views respectively of the die block.

Fig. 15 is a sectional view of a preferred form of trapezoidal section wire employed for the purposes of the present invention.

Figure 16:
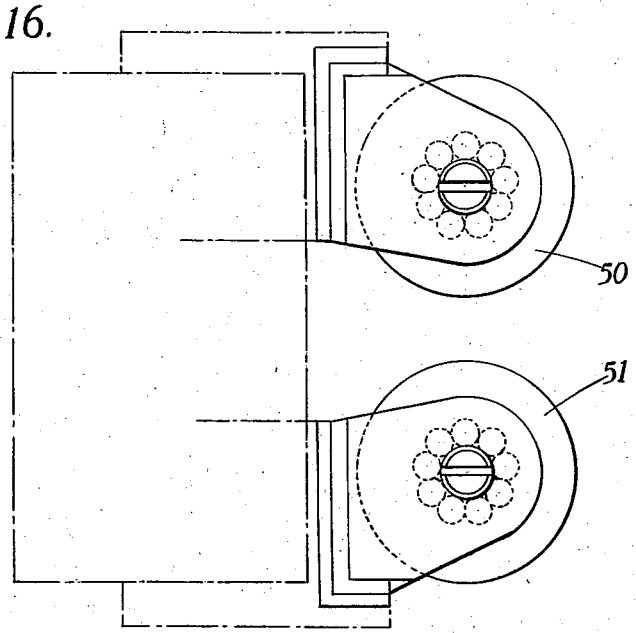
Figure 17:
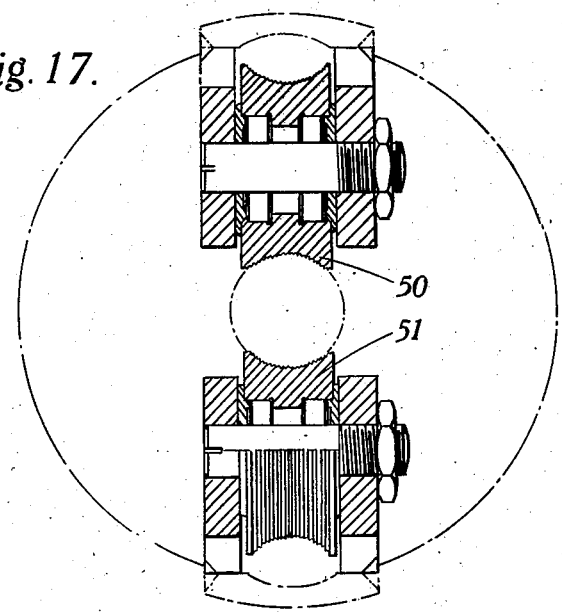

Figs. 16 and 17 are side and front sectional views of a form of rotating collet or chuck with roller jaws which may be employed for the purposes of the present invention.

Figure 2:
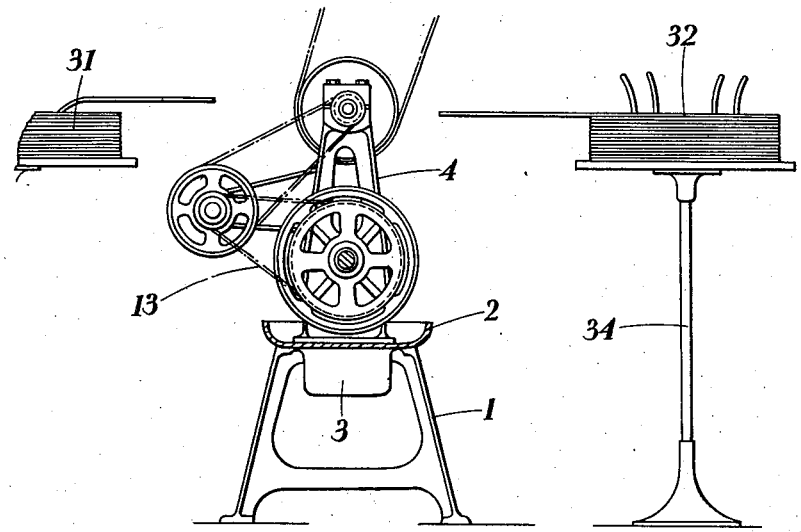
Fig. 2 is a part section on the line 2—2 of Fig. 1 looking in the direction of the arrow $x$.
Figure 3:
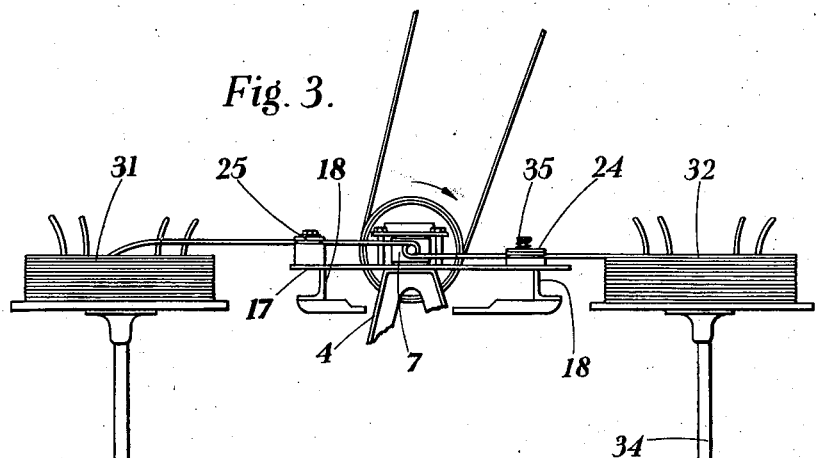
Fig. 3 is a part section on the line 3—3 of Fig. 1 looking in the direction of the arrow $y$.
Figure 18:
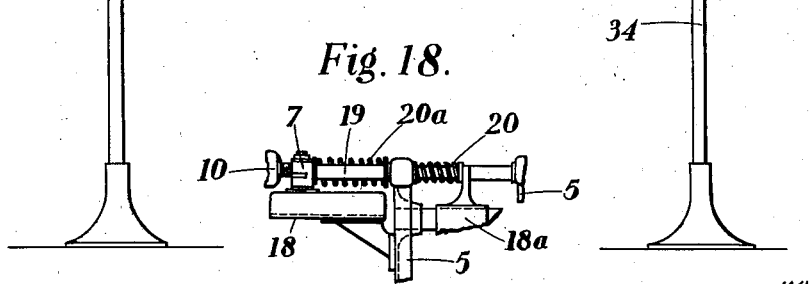
Figure 5:
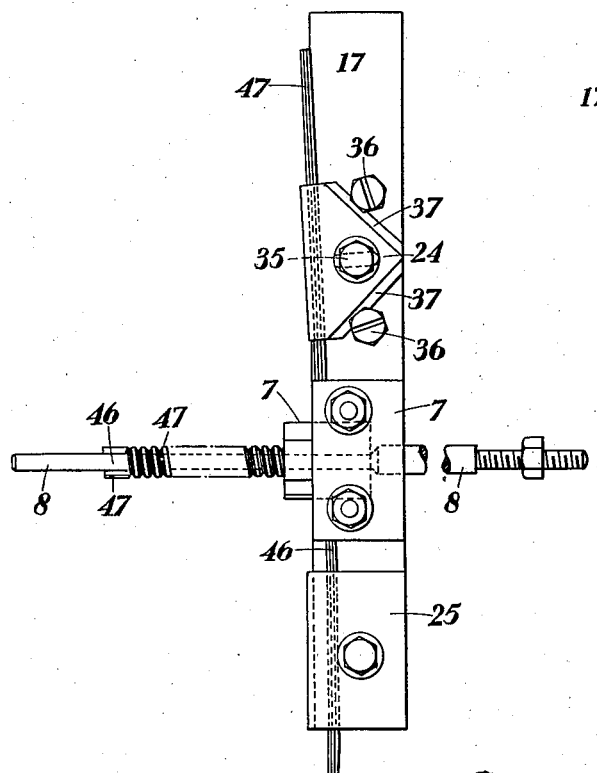
Figs. 5 and 6 are plan and front elevations respectively of the die block and allied parts.
Figure 6:
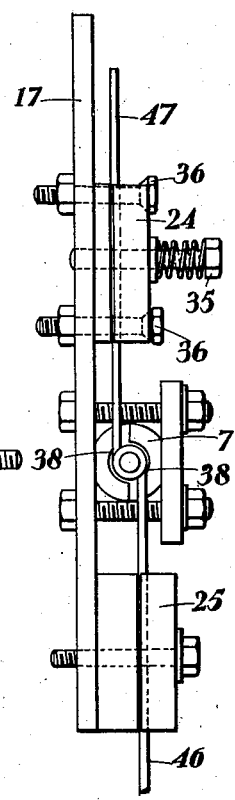

Fig. 18 shows a device for increasing the pressure on the coils.

Figs. 19 and 19a are longitudinal sections through the collet and mandrel illustrating the relation of the parts during a winding operation.

Fig. 20 is a section of flexible tubing formed in carrying out this method.

Figs. 1 to 4 show a general arrangement of an automatic wire winding machine adapted for carrying out the processes according to the present invention, the machine shewn being a converted automatic lathe.

1 is a foundation framing, with oil tray 2 and sump 3, 4 and 5 main standards, the former carrying the headstock 6 and the latter the die block 7 and die mandrel 8 and both together carrying a cam shaft 9.

10 is a suitable form of automatic chuck or collet rotatable with a hollow spindle 11 arranged to be driven from any convenient source of power e. g., through the medium of a pulley and belt drive 12.

Drive of the cam shaft 9 is derived from the spindle 11 through reduction gearing 13, (a reduction ratio of approximately from fifteen to ten to one in general serving well) so that cam drums 14, 15 fixed to the cam shaft 9 for operating the collet 10, and for causing the approach, after a predetermined recession movement, of the die block 7 respectively, shall periodically repeat that cycle of operations which consists in opening the collet 10, pushing the die block 7 forward, closing the collet 10 to grip that portion of the coil which has been advanced into its jaws, continuing the winding of the wire until the die block has again completed its predetermined recession movement, and then reopening the collet 10.

The cam drum 14 operates this collet in well known manner through the medium of the cam actuated slide 16, the setting of the cam being such that the collet opens when a predetermined number of turns of wire has been wound on the die mandrel 8. As the windings within the collet 10 are gripped thereby during the further winding of the wire round the mandrel, the die block 7 must recede from the collet 10. For this purpose it is mounted to slide to and from the collet 10.

It is convenient to mount the die block 7 on a long base plate 17 which rests simply on a pair of torque rails 18 disposed one towards each end of the base plate 17. The die mandrel 8 passes freely through the die block 7, between which and a slide 18a, actuated by the cam drum 15, is a sliding thrust sleeve 19. By means of this sleeve the thrust of the slide 18, as this is moved towards the collet 10 by the cam drum 15 when the collet 10 is opened, is transmitted to the die block 7, causing it to approach the collet and feed the tubing already made through the hollow shaft of the head-stock, a spring 20 being interposed between a thrust collar on the sleeve 19 and one of the standards 5 to return the sleeve 19 and slide 18a to initial position. In this arrangement the sleeve 19 and slide 18a is returned by the die block as this recedes from the collet, but by appropriately modifying the cam drum both the go and return movement of the slide 18a, and if desired of the sleeve 19, may be positively produced by the cam drum 15, in which case the spring 20 may be omitted.

20a designates a helical compression spring which may be interposed between the die block 7 and the head of the nearer standard 5 for yieldingly pressing the die block 7 against the coils during winding and so increasing the resistance offered to winding the second wire, between turns of the first wire particularly where the lead of the latter is small.

As a precautionary measure the die mandrel 8 is extended beyond the standards 5 and mounted in a separate thrust arm 21, for although, when the wires are arranged for balanced pull, little or no end thrust is found to be transmitted through the die mandrel while winding its proceeding, longitudinal movement of the die mandrel must be prevented while the tubing is being run off the mandrel.

As the winding proceeds the tubing may be conveniently run off into a guide trough or a stationary or rotating pipe 22 supported by suitable standards such as 23.

The die block 7 and wire guides 24, 25 are shewn more clearly on an enlarged scale by Figs. 5 and 6 and 11 to 14 wherein the enlarged porton 26 of the aperture 27 for the passage of the die mandrel 8 provides the clearance for winding the wire on the die mandrel, and the shoulder 28 against which the following wire in winding bears to cause the recession of the die block 7.

29, 30 are substantially tangential slots, permitting the entrance of two wires into the die block from wire reels 31, 32 supported on opposite sides of the machine by standards 33, 34, the wires being led to the die block through the wire guides 24, 25. One or both of these guides may be friction loaded and adjustably mounted; e. g., by the spring loaded screw bolt 35 and bevel headed screw nutted bolts 36 co-acting with bevels 37 on the upper member of the guide. The provision of means of adjustment, and/or spring loading, is more important in the case of the following, than of the leading, wire.

38 designates the fulcra formed by the upper or the lower faces of the respective slots 29, 30 with the wall of the enlarged portion 26 of the aperture 27.

Figure 8:
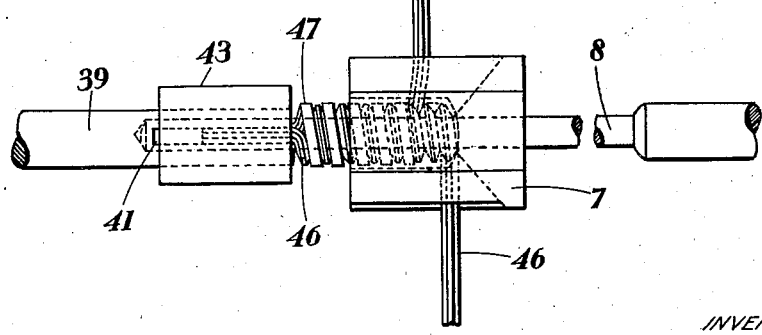

Appliances for starting the winding are shewn by Figs. 7 and 8. 39, 40 shew a rod having a solid inner portion 39, to be inserted into and gripped by the collet 10, and a hollow outer portion 40, provided with diametral longitudinal slots 41, 42 extending out to the free end of such hollow portions. 43 is a block or sleeve made to slide over the portion 40 and having longitudinal grooves 44, 45 therein corresponding to the slots 41, 42 and co-operating therewith for successively receiving the bent over ends of the leading and following wires 46, 47 when the die mandrel is inserted into the hollow portion 40 preparatory to advancing the die block 7 and starting the winding as hereinbefore described.

As shewn by Figs. 9 and 10, the sleeve 43 may be omitted, and a stronger starting rod provided by thickening the wall of the hollow portion 40, and forming this with diametral longitudinal grooves 48 having overhanging side walls 49, to prevent the bent over ends of the wires from canting after being inserted therein.

Figs. 16 and 17 illustrate an arrangement of round grooved roller jaws 50, 51 for a chuck 10 which may be adopted when it is desired to run off the tubing continuously by the axial thrust exerted against the shoulder 28 of the die block by the wires in winding, the roller jaws being serrated or knurled as shewn for promoting their grip on the tubing for rotating this as it feeds therethrough.

In winding, the coils are subjected to great pressure both from the adjacent coils and from the arbor or mandrel, and there is a danger that the wires may be so deformed that the wire in one coil overhangs the adjacent turns of the other coil, causing interlocking and interfering with the power of relative lateral displacement of the coils.

I have found that this danger can be eliminated or greatly decreased by forming the wires of one or both of the coils of triangular section with the sides of the triangle which contact with the other coil formed by convex arcs 52, 53 Fig. 15, which should be so chosen that the effect of compression and deformation in winding is to render the said sides approximately straight. In place of a triangular section, a trapezoidal section may be formed by cutting off the apex of the triangle, preferably forming this part or nose of the section also by a convex arc 54 of small radius. The third side or base may be straight, convex or concave joined to the other sides by convex arcs of small radii, and it may be so formed that the effect of the compression of the other sides tends to make it approach a straight form.

I have found that a good form for high tensile steel wire is that in which the maximum height of the arcs above lines or chords regarded as representing the flat sides of the triangle, is approximately one-tenth of the height of the triangle.

When four coils are employed there are two leading coils and two following coils. For example, if all the coils were of triangular or trapezoidal section two leading coils would be wound with the base inwards and be started first, and then the following coils with the base outwards would be forced between them as in the case of a single coil. A similar method would be applied for six or more coils, though for the reasons already given I do not think that such coils are advantageous. In such cases there must be a sufficiency of openings in the die, and these should preferably be so placed as to balance the pull of the wires on the mandrel, e. g. with four wires they should be placed at 90° apart. Alternatively the wires may be led in staggered formation into the die block, two through one tangential slot and two through the other tangential slot. An appropriate number of wire guides must be provided and the tubes made with the necessary number of openings.

What I claim is:—

1. A winding process for the manufacture of flexible tubing of the kind described which consists in securing the end of one of the wires which are intended to form the separate coils in a tubular holder which is adjustable on a mandrel and causing said wire to grip and rotate the said mandrel to wind a sufficiency of turns of such wire, securing a second wire in said holder and interwinding a sufficiency of said second wire in said first wire to form an initial length of interwound tubing, removing said holder and gripping such length of tubing so as to cause this to grip and rotate the mandrel and simultaneously and firmly winding such wires one in advance of the other around the mandrel in such manner as to cause the windings of the following coil to be forced between the windings of the leading coil so as continuously to open up and separate such last mentioned windings.

2. A winding process for the manufacture of flexible tubing of the type described which consists in winding a leading wire firmly on to a mandrel, simultaneously winding a following wire, and causing said following wire whilst the winding proceeds to separate and enter between convolutions formed by said leading wire at a position at which said convolutions are firmly wound around said mandrel.

3. A winding process for the manufacture of flexible tubing of the type described which consists in winding a leading wire firmly on to a mandrel, simultaneously winding a following wire, causing said following wire whilst the winding proceeds to separate and enter between convolutions formed by said leading wire at a position at which said convolutions are firmly wound around said mandrel, and intermittently delivering the wound tubing in an axial direction opposite to that in which the convolutions form along said mandrel.

4. A winding process for the manufacture of flexible tubing of the type described which consists in interwinding separate wires forming a portion of the tubing; gripping the formed tubing tightly on to a mandrel, and continuing the winding of the wires simultaneously one in advance of the other, causing one of said wires viz., a following wire, whilst the winding proceeds to separate and enter between convolutions formed by a leading wire at a position at which said convolutions are firmly wound around said mandrel, and intermittently releasing the grip on the tubing and feeding the wound tubing.

5. A winding process for the manufacture of flexible tubing of the type described which consists in winding a leading wire firmly on to a mandrel, simultaneously winding a following wire, causing said following wire whilst the winding proceeds to separate and enter between convolutions formed by said leading wire at a position at which said convolutions are firmly wound around said mandrel and continuously delivering the wound tubing whilst the process is in progress.

6. A process as in claim 2, in which at least one leading coil and at least one following coil are used, said leading coil or coils being at least one whole convolution in advance of said following coil or coils.

7. A process as in claim 2, in which there are at least two leading coils and at least two following coils.

8. A winding process for the manufacture of flexible tubing of the type described which consists in winding at least one leading wire firmly on to a mandrel, simultaneously winding on to said mandrel at least one following wire led from such a direction as to balance the pull of said leading wire or wires, and causing said following wire or wires whilst the winding proceeds to separate and enter between convolutions formed by the leading wire or wires at a position at which such convolutions are firmly wound around said mandrel.

9. A winding process for the manufacture of flexible tubing of the type described which consists in winding a leading wire of diminishing cross-section firmly on to a mandrel with its widest part innermost, simultaneously winding a following wire, which is of such section as to maintain spiral contact with the leading wire when the tubing is bent, and causing said following wire whilst the winding proceeds to separate and enter between convolutions formed by the leading wire at a position at which they are firmly wound around said mandrel.

10. A winding process for the manufacture of flexible tubing of the type described which consists in winding firmly on to a mandrel a leading wire having a diminishing cross section with its widest part innermost, simultaneously winding a following wire which is of diminishing cross section provided with convex sides and a convex apex wound apex inwards, and causing said following wire whilst the winding proceeds to separate and enter between convolutions formed by said leading wire at a position at which said convolutions are firmly wound around said mandrel.

11. A winding process for the manufacture of flexible tubing of the type described which consists in forming an initial length of tubing of interwound wires, gripping said formed length tightly on a mandrel so that the tubing and the mandrel can rotate solidly together, and rotating the tubing and mandrel so as to wind the respective wires in advance of one another on the mandrel, and causing a following wire whilst the winding proceeds to separate and enter between convolutions formed by a leading wire at a position at which said convolutions are firmly wound around said mandrel.

12. A process as in claim 2 which further consists in exerting a yielding pressure against the convolution during winding, tending to maintain the convolutions in close order.

13. Apparatus for producing flexible tubing of the kind described, comprising a mandrel upon which the tubing is wound, a chuck and a drive therefor, said chuck being adapted to grip a portion of the wound tubing and cause the latter to grip the said mandrel whereby the chuck and the mandrel rotate together whilst the winding of the wires on to the mandrel proceeds, and means for intermittently releasing the chuck and advancing the wound tubing axially.

14. Apparatus for producing flexible tubing of the kind described, comprising a mandrel upon which the tubing is wound, a chuck and a drive therefor, said chuck being adapted to grip a portion of the wound tubing and cause the latter to grip and rotate the mandrel whilst the winding of the wires on to the mandrel proceeds, means for tensioning the wires, wire guides for leading the wires from different directions to said mandrel and means for intermittently releasing the chuck and advancing the wound tubing axially.

15. Apparatus for producing flexible tubing of the kind described, comprising a mandrel upon which the tubing is wound, a chuck and a drive therefor, said chuck being adapted to grip a portion of the wound tubing and cause the latter to grip and rotate the mandrel whilst the winding of the wires on to the mandrel proceeds, means for tensioning the wires, wire guides for leading the wires to the mandrel from such directions as to balance the pull on the mandrel and means for intermittently releasing the chuck and advancing the wound tubing axially.

16. In the process according to claim 2, the use of wires of substantially triangular form having convex sides as and for the purposes described.

17. In the process according to claim 2, the use of wires of substantially trapezoidal form having convex sides as and for the purposes described.

18. In the process according to claim 2, the use of wires of substantially trapezoidal section having the shortest side or apex of convex form as and for the purposes described.

19. In the process according to claim 2, the use of wires of substantially trapezoidal form having convex sides and a convex apex as and for the purposes described.

RENE TONDEUR.